United States Patent Office 3,096,316
Patented July 2, 1963

3,096,316
POLYMERIZATION OF PROPYLENE WITH A CATALYST PREPARED BY GRINDING Al AND TiCl₃ IN THE PRESENCE OF H₂
Donald F. Hoeg, Kensington, Md., assignor to W. R. Grace & Co., Clarksville, Md., a corporation of Connecticut
No Drawing. Filed July 7, 1959, Ser. No. 825,410
4 Claims. (Cl. 260—93.7)

This invention is directed to making a catalyst by grinding a mixture of aluminum metal and titanium trichloride in a Al:TiCl₃ weight ratio of 0.5 to 100:1 in the presence of hydrogen until substantially 1 atom of hydrogen is absorbed per 2 atoms of aluminum (1 mole H₂/4 gram atoms Al), and to the use of the resultant ground material as a catalyst for preparing normally solid polypropylene with a substantial isotactic content by contacting propylene with the catalyst in an inert hydrocarbon solvent at a temperature in the range of 25 to 150° C. and at a pressure of at least 50 p.s.i.g.

The following examples illustrate without limiting the invention.

Example 1

The catalyst-forming apparatus was a modified laboratory size (4-ounce) ball mill, the modification consisting of a coupled hydrogen cylinder fitted with a supporting ring the same diameter of the ball mill jar so that both jar and cylinder could be rotated on the mill rollers as a unit. In this way the contents of the mill jar were kept under hydrogen pressure throughout the milling run. The cylinder was attached to the jar by means of standard pipe fittings, including cutoff valves, on both ends of the cylinder. The valve on the outside was adapted to receive a pressure gauge, so that the pressure drop could be checked periodically.

Aluminum turnings, 16 g., and TiCl₃, 30 g. were placed in the ball mill jar, with about ⅓ its volume of stainless steel balls. The jar was flushed with nitrogen and then immediately connected to the hydrogen cylinder (60 p.s.i.g. of H₂ provided for total volume—jar and cylinder—of 0.54 liter).

Milling was begun and continued until substantially 0.15 mole of H₂ were absorbed into the milled product, requiring 120 hours. This H₂ pick-up is equal to 1 atom of hydrogen per 2 atoms of Al. This ratio is critical, in the sense that additions of hydrogen substantially greater or less than this will give a catalyst of greatly reduced activity. In view of the criticality of the amount of hydrogen added, the rate of hydrogen absorption should be followed carefully during the milling operation. The absorption rate will, of course, depend on the ball milling rate, size of the mill jar, hydrogen pressure, ball loading and so on, and may vary somewhat from run to run, even in the same equipment. The number of moles of hydrogen absorbed, $n$ is readily determined by the well-known formula, $v(P_1-P_2)=nRT$. This calculation is readily made by one skilled in the art.

In supplying hydrogen to the ball mill jar, any hydrogen pressure whatever is suitable, e.g., atmospheric pressure to 1000 atmospheres, and even higher. Also, any means of supplying hydrogen to the mill is suitable. The jar can be pressured directly with hydrogen if desired, thereby dispensing with the auxiliary cylinder described in Example 1. The critical thing about the hydrogen is not the pressure, but the amount absorbed.

Example 2

1.9 grams of the catalyst prepared according to Example 1 was placed in a stainless steel 1-liter autoclave fitted with a stirrer. 300 ml. of pure dry cyclohexane was added. The autoclave was heated to 50° C. and pressured with propylene at 135 p.s.i.g. The temperature was then raised to 90° C. and the autoclave was held at this temperature for 1¾ hours. At the end of the reaction, the autoclave was vented, cooled, and the polymer product recovered. 8 grams of solid polypropylene was obtained, containing 35% isotactic polypropylene.

The criticality of hydrogen addition is evident when it is considered that zero hydrogen absorption gives less than 1 gram of polymer product under the aforesaid conditions, and furthermore, that an absorption rate of about 1 gram atom of hydrogen per 0.75 gram atom of aluminum also gives less than 1 gram of polymer product.

The ratio of aluminum to titanium trichloride is not critical and can vary within the range of 0.5–100:1 weight ratio aluminum:TiCl₃. A practical range is 0.5 to 2:1.

In carrying out the propylene polymerization, it is desirable to use an inert hydrocarbon reaction medium such as heptane, heptene, octane, isooctane, pentane, benzene, toluene, xylene, and the like. The reaction medium is not critical and substantially any of the inert hydrocarbon solvents well known to those in the polypropylene synthesis art can be used.

The temperature of the polymerization reaction is not critical. A range of 25 to 150° C. is operable. Preferably, for practical purposes, a temperature in the range of 50 to 120° C. is recommended. Nor is the pressure of the polymerization reaction critical. Any pressure within the range of 50 to 1000 p.s.i. is suitable, and for practical purposes a pressure in the range of 100 to 500 p.s.i. is recommended.

The reaction time can be varied under a wide range. The polymerization starts almost immediately on bringing the reaction materials up to reaction conditions of temperature and pressure, and the reaction is generally complete within 2 hours, but can be continued over extended periods.

The ratio of catalyst to propylene reactant is not critical. A catalyst:propylene weight range of 0.001–1:1 is suitable.

The normally solid polypropylenes prepared according to this invention are not new materials, and have the same uses as known polypropylenes, for example in the molding, film, and fiber arts.

I claim:
1. The method of preparing a catalyst which comprises grinding a mixture of aluminum metal and titanium trichloride in an initial Al:TiCl₃ weight ratio of 0.5 to 100:1 in the presence of hydrogen until hydrogen is absorbed into the mixture to provide a hydrogen:aluminum ratio of substantially 1 atom of hydrogen per 2 atoms of aluminum.

2. The method according to claim 1 in which aluminum and TiCl₃ in a weight ratio of about 1:2 are ball-milled under hydrogen pressure of approximately 60 p.s.i.g.

3. The method of polymerizing propylene to normally solid polypropylene comprising contacting propylene, at a temperature in the range of 50 to 120° C. and a pressure in the range of 100 to 500 p.s.i., in an inert hydrocarbon solvent, with a catalyst prepared by grinding a mixture of aluminum metal and titanium trichloride in an initial Al:TiCl₃ weight ratio of 0.5 to 100:1 in the presence of hydrogen until hydrogen is absorbed to provide a hydrogen:aluminum ratio of substantially 1 atom of hydrogen per 2 atoms of aluminum.

4. The method according to claim 3 in which the polymerization temperature is about 80 to 90° C. and the propylene pressure is about 135 p.s.i.g.

References Cited in the file of this patent

UNITED STATES PATENTS

| | | |
|---|---|---|
| 2,824,089 | Peters | Feb. 18, 1958 |
| 2,886,561 | Reynolds et al. | May 12, 1959 |
| 2,891,857 | Eaton | June 23, 1959 |
| 2,899,416 | Schreyer | Aug. 11, 1959 |
| 2,928,818 | Carter et al. | Mar. 15, 1960 |

FOREIGN PATENTS

| | | |
|---|---|---|
| 538,782 | Belgium | Dec. 6, 1955 |
| 548,394 | Belgium | Dec. 5, 1956 |
| 1,132,506 | France | Nov. 5, 1956 |
| 1,135,808 | France | Dec. 22, 1956 |
| 1,147,868 | France | June 11, 1957 |

OTHER REFERENCES

Moeller: "Inorganic Chemistry," page 409. John Wiley & Sons, Inc., New York, 1952.